United States Patent [19]

Fujita et al.

[11] Patent Number: 5,147,839
[45] Date of Patent: * Sep. 15, 1992

[54] PRODUCTION OF α-OLEFIN POLYMERS

[75] Inventors: Takashi Fujita; Toshihiko Sugano, both of Yokkaichi, Japan

[73] Assignee: Mitsubishi Petrochemical Company Limited, Tokyo, Japan

[*] Notice: The portion of the term of this patent subsequent to Feb. 27, 2007 has been disclaimed.

[21] Appl. No.: 651,946

[22] Filed: Feb. 7, 1991

[30] Foreign Application Priority Data

Feb. 8, 1990 [JP] Japan .................................. 2-28755

[51] Int. Cl.$^5$ ............................................. C08F 4/656
[52] U.S. Cl. .................................. 502/119; 502/108; 502/112; 502/121; 502/122; 502/123; 502/124; 502/125; 502/126; 502/127; 526/119; 526/125
[58] Field of Search ............... 502/108, 112, 119, 121, 502/122, 123, 124, 125, 126, 127

[56] References Cited

U.S. PATENT DOCUMENTS 4,780,443 10/1988 Matsuura et al. ............... 502/125 X
4,904,630 2/1990 Matsuura et al. ............... 502/125 X
5,032,563 7/1991 Matsuura et al. ................... 502/112

FOREIGN PATENT DOCUMENTS 0029232 5/1981 European Pat. Off. .
0299712 1/1988 European Pat. Off. .

*Primary Examiner*—Patrick P. Garvin
*Attorney, Agent, or Firm*—Oblon, Spivak, McClelland, Maier & Neustadt

[57] ABSTRACT

Ziegler polymerization of α-olefins is disclosed which is characterized by a solid catalyst component. The solid catalyst component, Component (A), comprises Sub-component (i) which is a solid catalyst component for Ziegler catalysts comprising Ti, Mg and a halogen; Sub-component (ii) which is a silicon compound having a plurality of a bond represented by a formula: Si—OR$^1$

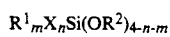

$$R^1{}_m X_n Si(OR^2)_{4-n-m}$$

wherein R$^1$ indicates a hydrocarbyl group of 1 to 8 carbon atoms, Sub-component (iii) which is a vinylsilane compound, and Sub-component (iii) which is an organometal compound of a metal of Groups I to IV of the Periodic Table. No need of an outside electron donor may be required, and the polymer produced is improved in its content of a "tacky" polymer.

8 Claims, No Drawings

PRODUCTION OF α-OLEFIN POLYMERS

BACKGROUND OF THE INVENTION

1. Field of the Art

The present invention relates to Ziegler polymerization of olefins. More particularly, the present invention is concerned with Ziegler polymerization of olefin, or α-olefins of at least 3 carbon atoms, in particular, characterized by, among others, the solid catalyst components comprising a transition metal in Ziegler catalysts.

Use of the solid catalyst component in accordance with the present invention in Ziegler catalysts as the transition metal component will make it possible to produce polymers endowed with improved stereoregularity in an improved yield with decreased production of by-product polymers.

2. Background of the invention

The catalysts heretofore proposed for the polymerization of olefins comprising a solid catalyst component containing titanium, magnesium and a halogen as the essential ingredients and an organoaluminum have very high activity, but require the use of an electron donor compound during polymerization as what is called "outside electron donor" when the sterecspecificity of the product polymers is to be improved.

However, the catalysts in which an electron donor is used entail such problems that the electron donor used may react with the organoaluminum compound used thereby lowering the polymerization velocity and the reaction of the electron donor with the organoaluminum compound is accelerated upon increase in the temperature whereby higher polymerization should be avoided, which will in turn result in several disadvantages such that it will be restricted to increase productivity inherent in increasing the polymerization temperature or it will be difficult to control performance of the product polymers such as to control molecular weight of the polymers. Furthermore, it may require a considerable amount of an electron donor in order to obtain the stereospecificity of the polymers at a desired level, whereby the product polymers which may be obtained without undergoing the catalyst removal step may have odor of the electron donor used.

Accordingly, it has teen desired to develop catalysts which produce highly stereospecific polymers in a high yield without use of an electron donor as the outside electron donor.

Japanese Patent Laid-Open Publication No. 138715/1983 discloses catalysts for polymerization which do not require the outside electron donor, which catalysts comprise an organoaluminum compound and a solid component which has been prepared by contacting a titanium complex (1) comprising a tetra-valent titanium, magnesium, a halogen and an electron donor with an organosilicon compound (2) having a bond of Si—O—C in the presence of an organoaluminum compound or after the titanium complex (1) having been treated with an organoaluminum compound.

This proposal may have succeeded in solving the problems referred to, but may still entail problems such that the polymer performance may not be improved to a desired level and the proportions of the titanium component to the organoaluminum component may be confined in a certain range.

Japanese Patent Laid-Open Publication No. 187707/1987 proposes the use of a certain specified organoalkoxysilicon compound, which appears to have removed, in considerable degree, the necessity that an organoaluminum compound used in the polymerization be in a confined range. However, the activity of the catalyst in view of the polymer yield obtained is not shown therein to be always at a level where no catalyst removal processing is required especially when the molecular weight control or production of copolymers is desired, whereby further improvement may be desired.

On the other hand, Japanese Patent Laid-Open Publication Nos. 15804/1988, 68622/1988, 68648/1988, 69809/1988, 278502/1989, 279940/1989 and 282203/1989 disclose catalysts which have been treated by a trialkylarylsilane or by a trialkylvinylsilane or catalysts which have a polymer of a trialkylarylsilane or a trialkylvinylsilane contained therein will work as nucleating agent in the polymers thereby produced whereby the polymers produced are improved in transparency and stiffness.

The proposals may be appreciated since the crystallinity of the polymers may have been increased due to the reduction in size of the spherulites, but the problems that by-product polymers are formed and the catalyst activity is not very high still remain unsolved.

SUMMARY OF THE INVENTION

The present invention is to give solution to the above problems by use of a specified solid catalyst component by Ziegler catalysts.

More particularly, the present invention presents a solid catalyst component for Ziegler catalysts obtained by contacting the following Sub-components (i) to (iv):

Sub-component (i) which is a solid catalyst component for Ziegler catalysts comprising titanium, magnesium and a halogen as the essential components;

Sub-component (ii) which is a silicon compound having a plurality of a bond represented by a formula

$$Si-OR^1$$

wherein $R^1$ indicates a hydrocarbyl group of 1 to 8 carbon atoms,

Sub-component (iii) which is a vinylsilane compound; and

Sub-component (iv) which is an organometal compound of a metal of the Groups I to III of the Periodic Table.

The present invention also presents a catalyst for polymerization of alpha-olefins which comprises the following Component (A) and Component (B):

Component (A) which is a solid catalyst component for Ziegler catalysts, which solid catalyst component is obtained by contacting the following Sub-components (i) to (iv):

Sub-component (i) which is a solid catalyst component for Ziegler catalysts comprising titanium, magnesium and a halogen as the essential components;

Sub-component (ii) which is a silicon compound having a plurality of a bond represented by a formula

$$Si-OR^1$$

wherein $R^1$ indicates a hydrocarbyl group of 1 to 8 carbon atoms,

Sub-component (iii) which is a vinylsilane compound; and

Sub-component (iv) which is an organometal compound of a metal of the Groups I to III of the Periodic Table; and Component (B) which is an organoaluminum compound.

The present invention further presents a process for producing α-olefin polymers which comprises contacting an olefin with a catalyst thereby to polymerize the olefin, the catalyst comprising the following Component (A) and Component (B):

Component (A) which is e solid catalyst component for Ziegler catalysts, which solid catalyst component is obtained by contacting the following Sub-components (i) to (iv):

Sub-component (i) which is a solid catalyst component for Ziegler catalysts comprising titanium, magnesium and a halogen as the essential components;

Sub-component (ii) which is a silicon compound having a plurality of a bond represented by a formula $$Si-OR^1$$

wherein $R^1$ indicates a hydrocarbyl group of 1 to 8 carbon atoms,

Sub-component (iii) which is a vinylsilane compound; and

Sub-component (iv) which is an organometal compound of a metal of the Groups I to III of the Periodic Table; and Component (B) which is an organoaluminum compound.

The solid catalyst component for Ziegler catalysts and the catalyst for polymerizing alpha-olefins comprising the solid catalyst component, in accordance with the present invention, is capable of producing alpha-olefin polymers endowed with stereospecificity at a high level in a high yield without or slightly resorting to an electron donor as an outside donor during the polymerization, and also of reducing formation of non-crystalline or amorphous polymers which may cause films produced therefrom to be tacky, whereby the problems inherent in the known catalysts may be solved. The advantages inherent in the polymerization catalyst in accordance with the present invention can alternatively regarded as the advantages inherent in the process for polymerizing alpha-olefins in accordance with the present invention.

These advantages inherent in the present invention are assumed to be of value in commercial production of alpha-olefin polymers, and are regarded as important feature of the catalyst in accordance with the present invention. The reason why these advantages are obtained has not been fully elucidated, but the following mechanism may be assumed to contribute to the advantages: Sub-component (iii) may react with the organometal compound of Sub-component (iv) thereby to increase its activity for reducing the titanium of Sub-component (i) and to cause the action on Sub-component (i) of Sub-component (ii) on which stereoregularity may depend.

DETAILED DESCRIPTION OF THE INVENTION

[I] Catalyst

The catalyst of the present invention comprises a combination of specific components (A) and (B). Here, the wording comprises does not mean that the components are limited only to those mentioned (namely, A and B), and does not exclude co-presence of other components compatible with or suited for the purpose, such as an outside electron donor which is not essential but can be used if desired.

Component (A)

The Component (A) of the catalyst of the present invention is a solid catalyst component for Ziegler catalysts obtained by contacting the Sub-components (i) to (iv) shown below. Here, the wording "obtained by contacting" does not mean that the components are limited only to those mentioned, namely (i) to (iv), and does not exclude co-presence of other components suited for the purpose.

Sub-component (i)

Sub-component (i) is a solid component comprising titanium, magnesium and a halogen as the essential components. Here, the wording "comprising as the essential components" indicates that it can also contain other elements suited for the purpose than the three components mentioned, that these elements can exist in any desired compound suited for the purpose respectively, and also that these elements can also exist in the form mutually bonded together. Solid components comprising titanium, magnesium and a halogen per se are known. For example, those as disclosed in Japanese Laid-open Patent Publications Nos. 45688/1978, 3894/1979, 31092/1979, 39483/1979, 94591/1979, 118484/1979, 131589/1979, 75411/1980, 90510/1980, 90511/1980, 127405/1980, 147507/1980, 155003/1980, 18609/1981, 70005/1981, 72001/1981, 86905/1981, 90807/1981, 155206/1981, 3803/1982, 34103/1982, 92007/1982, 121003/1982, 5309/1983, 5310/1983, 5311/1983, 8706/1983, 27732/1983, 32604/1983, 32605/1983, 67703/1983, 117206/1983, 127708/1983, 183708/1983, 183709/1983, 149905/1984, 149906/1984, 130607/1985, 55104/1986, 204204/1986, 508/1987, 15209/1987, 20507/1987, 184005/1987, 236805/1987, 113004/1988, 199207/1988, 139601/1989 and 215806/1989 may be employed.

These solid components can be used as such or after having been treated with a W or Mo compound.

As the magnesium compound which is the magnesium source to be used in the present invention, magnesium dihalides, alkylmagnesium halides, dialkoxymagnesiums, alkoxymagnesium halides, magnesium oxyhalides, dialkylmagnesiums, magnesium oxide, magnesium hydroxide, carboxylates of magnesium, etc. are exemplified. Among these magnesium compounds, magnesium dihalides, alkylmagnesium halides, dialkoxymagnesiums and alkoxymagnesium halides, particularly magnesium dihalides such as $MgCl_2$, are preferred.

As the titanium compound which is the titanium source, compounds represented by the formula $Ti(OR^2)_{4-n}X_n$ wherein $R^2$ is a hydrocarbyl group, preferably having about 1 to 10 carbon atoms, X represents a halogen atom and n is an integer of $0 \leq n \leq 4$) and polymers of a titanium tetraalkoxide. Specific examples may include:

titanium tetrahalides such as $TiCl_4$, $TiBr_4$ and the like;
alkoxytitanium halides such as
$Ti(OC_2H_5)Cl_3$,
$Ti(OC_2H_5)_2Cl_2$,
$Ti(OC_2H_5)_3Cl$,
$Ti(O-iC_3H_7)Cl_3$,
$Ti(O-nC_4H_9)Cl_3$,
$Ti(O-nC_4H_9)_2Cl_2$, Ti(OC$_2$H$_5$)Br$_3$,
Ti(OC$_2$H$_5$)(OC$_4$H$_9$)$_2$Cl,
Ti(O—nC$_4$H$_9$)$_3$Cl,
Ti(O—C$_6$H$_5$)Cl$_3$,
Ti(O—iC$_4$H$_9$)$_2$Cl$_2$,
Ti(OC$_5$H$_{11}$)Cl$_3$,
Ti(OC$_6$H$_{13}$)Cl$_3$, and the like;
and titanium tetraalkoxides such as
Ti)OC$_2$H$_5$)$_4$,
Ti(O—iC$_3$H$_7$)$_4$,
Ti(O—nC$_3$H$_7$)$_4$,
Ti(O—nC$_4$H$_9$)$_4$,
Ti(O—iC$_4$H$_9$)$_4$,
Ti(O—nC$_5$H$_{11}$)$_4$,
Ti(O—nC$_6$H$_{13}$)$_4$,
Ti(O—nC$_7$H$_{15}$)$_4$,
Ti(O—nC$_8$H$_{17}$)$_4$,
Ti[O—CH$_2$CH(CH$_3$)$_2$[$_4$,
Ti[O—CH$_2$CH(C$_2$H$_5$)C$_4$H$_9$]$_4$, and the like.

Polymers of a titanium tetraalkoxide may include those represented by the following formula:

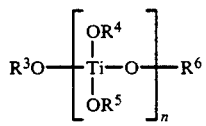

wherein, R$^3$ R$^6$ represent the same or different hydrocarbyl groups, preferably aliphatic hydrocarbyl group having 1 to 10 carbon atoms or aromatic hydrocarbyl groups, particularly aliphatic hydrocarbyl groups having 2 to 6 carbon atoms. n represents a number of 2 or more, particularly a number up to 20. The value of n should be desirably selected so that the polytitanate itself or as a solution can be provided in a liquid state for the contact step with other components. A suitable n selected in view of ease of handling may be about 2 to 14, preferably 2 to 10. Specific examples of such polytitanates may include n-butylpolytitanate (n=2 to 10), hexylpolytitanate (n=2 to 10), n-octylpolytitanate (n=2 to 10), and the like. Among them, n-butylpolytitanate is preferred.

It is also possible to use, as the titanium compound for the titanium source, a molecular compound obtained by reacting an electron donor as described below with a compound TiX'$_4$ (where X' represents a halogen). Specific examples may include:
TiCl$_4$.COC$_2$H$_5$,
TiCl$_4$.CH$_3$CO$_2$C$_2$H$_5$,
TiCl$_4$.C$_6$H$_5$NO$_2$,
TiCl$_4$.CH$_3$COCl,
TiCl$_4$.C$_6$H$_5$COCl,
TiCl$_4$.C$_6$H$_5$CO$_2$C$_2$H$_5$,
TiCl$_4$.ClCOC$_2$H$_5$,
TiC$_4$H$_4$O, and the like.

Among these titanium compounds, TiCl$_4$, Ti(OEt)$_4$, Ti(OBu)$_4$, and Ti(OBu)Cl$_3$ are preferred.

As to the halogen source, it is a common practice to supply the halogen from the halide compounds of magnesium and/or titanium as described above, but it can be also supplied from known halogenating agents such as halogen compounds of aluminum, halogen compounds of silicon, halogen compounds of phosphorus, and the like.

The halogen contained in the catalyst components may be fluorine, chlorine, bromine, iodine or a mixture of these, particularly preferably chlorine.

The solid component to be used in the present invention can also include, in addition to the above essential components: a silicon compound such as SiCl$_4$, CH$_3$SiCl$_3$, and the like; a polymeric silicon compound having the structure represented by the following formula:

wherein R$^7$ is a hydrocarbyl group having about 1 to 10, particularly about 1 to 6 carbon atoms and having a viscosity of about 1 centistoke to 100 centistokes, such as methylhydrogenpolysiloxane, ethylhydrogenpolysiloxane, phenylhydrogenpolysiloxane, cyclohexylhydrogenpolysiloxane, 1,1,3,3-tetramethyldisiloxane, 1,3,5,7-tetramethylcyclotetrasiloxane, 1,3,5,7,9-pentamethylcyclopentasiloxane and the like; an aluminum compound such as Al(OiC$_3$H$_7$)$_3$, AlCl$_3$, AlBr$_3$, Al(OC$_2$H$_5$)$_3$, Al(OCH$_3$)$_2$Cl; a boron compound such as B(OCH$_3$)$_3$, B(OC$_2$H$_5$)$_3$, B(OC$_6$H$_5$)$_3$; a wolfram compound such as WCl$_6$, WBr$_5$ and a molybdenum compound such as MoCl$_5$ and MoBr$_5$.

These optional compounds may remain in the solid component as the components of silicon, aluminum and boron.

Further, in preparing the solid component, use can also be made of an electron donor as what is called "an inside donor".

Examples of the electron donor or the inside donor which can be used for preparation of the solid component may include oxygen-containing electron donors such as alcohols, phenols, ketones, aldehydes, carboxylic acids, esters of an organic acid or an inorganic acid, ethers, acid amides, acid anhydrides, and the like; and nitrogen-containing electron donors such as ammonia, amines, nitriles, isocyanates, and the like.

More specifically, there may be included: (a) alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol, isopropylbenzyl alcohol and the like; (b) phenols having 6 to 25 carbon atoms which may or may not have an alkyl group, such as phenol, cresol, xylenol, ethylphenol, propylphenol, cumylphenol, nonylphenol, naphthol and the like; (c) ketones having 3 to 15 carbon atoms, such as acetone, methyl ethyl ketone, methyl isobutyl ketone, acetophenone, benzophenone and the like; (d) aldehydes having 2 to 15 carbon atoms, such as acetaldehyde, propionaldehyde, octylaldehyde, benzaldehyde, tolualdehyde, naphthaldehyde and the like; (e) organic acid esters having 2 to 20 carbon atoms, such as methyl formate, methyl acetate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, coumarine, phthalide, ethylene carbonate, cellosolve acetate, cellosolve isobutyrate and cellosolve benzoate, etc.; (f) inorganic acid esters, such as silicates such as ethyy silicate, butyl silicate, phenyl-triethoxysilane, etc.; (g) acid halides having 2 to 15 carbon atoms, such as acetyl chloride, benzoyl chloride, toluyloic chloride, anisic chloride, phthaloyl chloride, phthaloyl isochloride and the like; (h) ethers having 2 to 20 carbon atoms, such as methyl ether, ethyl ether, isopropyl ether, butyl ether, amyl ether, tetrahydrofuran, anisole, diphenyl ether and the like; (i) acid amides, such as acetic amide, benzoic amide, toluyloic amide and the like; (j) amines, such as monomethylamine, monoethylamine, diethylamine, tributylamine, piperidine, tribenzylamine, aniline, pyridine, picoline, tetramethylethylenediamine and the like; and (k) nitriles, such as acetonitrile, benzonitrile, tolunitrile and the like. One or more of these electron donors can be used in preparing the solid catalyst component. Among them, preferred are organic acid esters and acid halides, particularly preferably phthalic acid esters, phthalic acid halides, and cellosolve acetate.

The amounts of the above respective components used may be at any desired level, so long as the advantages inherent in the present invention can be attained, but, generally speaking, the following ranges are preferred.

The amount of the titanium compound used may be within the range of $1 \times 10^{-4}$ to 1000, preferably 0.01 to 10, in terms of molar ratio relative to the amount of the magnesium compound used. When a compound as the halogen source is used, its amount used may be within the range of $1 \times 10^{-2}$ to 1000, preferably 0.1 to 100, in terms of a molar ratio relative to magnesium used, irrespective of whether the titanium compound and/or the magnesium compound may contain a halogen or not.

The amount of the silicon, aluminum, boron, wolfram or molybdenum compound when used may be within the range of $1 \times 10^{-4}$ to 100, preferably 0.001 to 10, in terms of a molar ratio to the amount of the above magnesium compound used.

The amount of the electron donor compound when used may be within the range of $1 \times 10^{-3}$ to 10, preferably 0.01 to 5, in terms of a molar ratio relative to the amount of the above magnesium compound used.

The solid component for preparing the Sub-component (i) may be prepared from the titanium source, the magnesium source and the halogen source, and further optionally other components such as an electron donor according to methods mentioned below.

(a) A method in which a magnesium halide optionally together with an electron donor is contacted with a titanium compound.

(b) A method in which alumina or magnesia is treated with a phosphorus halide compound, and the product is contacted with a magnesium halide, an electron donor, a titanium halide-containing compound.

(c) A method in which a solid product obtained by contacting a magnesium halide with a titanium tetraalkoxide and a specific polymeric silicon compound is contacted with a titanium halide compound and/or a silicon halide compound.

As the polymeric silicon compound, those represented by the following formula are suitable:

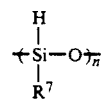

wherein $R^7$ is a hydrocarbyl group having about 1 to 10 carbon atoms, n is a polymerization degree such that the viscosity of the polymeric silicon compound may be 1 to 100 centistokes.

Among them, methylhydroqenpolysiloxane, 1,3,5,7-tetramethylcyclotetrasiloxane, 1,3,5,7,9-pentamethylcyclopentacycloxane, ethylhydrogenpolysiloxane, phenylhydrogenpolysiloxane, and cyclohexylhydrogen polysiloxane are preferred.

(d) A method in which the solid product obtained by a method (c) is contacted with an electron donor and a halogen compound of wolfram.

(e) A method in which a magnesium compound is dissolved in a titanium tetraalkoxide and an electron donor, and the solid component precipitated from the solution upon addition thereto of a halogenating agent or a titanium halide compound is contacted with a titanium compound. Examples of halogenating agents include silicon halides, aluminium halides, and halogen compounds of phosphorus.

(f) A method in which an organomagnesium compound such as Grignard reagent, etc. is reacted with a halogenating agent, a reducing agent, etc., and then the reaction product is contacted with an electron donor and a titanium compound.

(g) A method in which an alkoxymagnesium compound is contacted with a halogenating agent and/or a titanium compound in the presence or absence of an electron donor.

Among these methods, method (c), (e) and (g) are preferable, the method (c) being more preferable.

Contact of the three components can be also effected in the presence of a dispersing medium. As the dispersing medium in that case, hydrocarbons, halogenated hydrocarbons, dialkylsiloxanes, etc. may be exemplified. Examples of hydrocarbons may include hexane, heptane, toluene, cyclohexane and the like; examples of halogenated hydrocarbons include n-butyl chloride, 1,2-dichloroethylene, carbon tetrachloride, chlorobenzene, etc.; and examples of dialkylpolysiloxane include dimethylpolysiloxane, methylphenylpolysiloxane and the like.

According to the above preferable embodiments for preparing the solid Sub-component (i) wherein two types of contacts are practiced, it is general that dissolution of the magnesium dihalide takes place at the former contact, and precipitation of the solid containing the magnesium dihalide takes place at the latter contact. The precipitated solid should be desirably washed with a solvent compound as described above before use for the further step wherein it is contacted with the Sub-component (ii) and others.

Sub-component (ii)

Sub-component (ii) for preparing the Component (A) is a silicon compound having a plurality of a bond expressed by a formula

wherein $R^1$ is a hydrocarbyl group of 1 to 8 carbon atoms.

It is a common practice to use the silicon compounds wherein the valences of the silicon atoms other than those occupied by the group $OR^1$, if such remain unoccupied, may be occupied by one selected from the group of a hydrogen atom, a talogen atom, a hydrocarbyl group such as an alkyl, cycloalkyl, aryl and the like, or a siloxy group, provided that Sub-component (ii) is not the same as Sub-component (iii).

Preferable silicon compounds as Sub-component (ii) are those at least one hydroczrbyl group attached to the silicon atom. More preferably, the hydrocarbyl group has a branch at the carbon atom adjacent to the silicon atom. The branch may preferably be an alkyl group, cycloalkyl group or aryl group such as phenyl or methyl-substituted phenyl group. More preferable, the carbon atom adjacent to the silicon atom, namely α-carbon atom, is a secondary or tertiary carbon atom in a branched hydrocarbyl group having 3 to 20 carbon atoms. Most preferably, the carbon atom connected with the silicon atom is a tertiary carbon atom in a branched hydrocarbyl group having 4 to 10, carbon atoms.

Specific examples of the silicon compounds may include:
$(CH_3)Si(OCH_3)_3$,
$(CH_3)Si(OC_2H_5)_3$,
$(C_2H_5)_2Si(OCH_3)_2$,
$(i\text{—}C_3H_7)_2Si(OCH_3)_2$
$(n\text{—}C_6H_{13})Si(OCH_3)_3$,
$(C_2H_5)Si(OC_2H_5)_3$,
$(n\text{—}C_{10}H_{21})Si(OC_2H_5)_3$,
$(CH_2\text{=}CH)Si(OCH_3)_3$,
$(C_2H_5)HSi(OC_2H_5)_2$,
$Cl(CH_2)_3Si(OCH_3)_3$,
$Si(OCH_3)_4$,
$HSi(OCH_3)_3$,
$Si(OC_2H_5)_3Cl$,
$(C_2H_5)_2Si(OC_2H_5)_2$,
$(C_{17}H_{35})Si(OCH_3)_3$,
$Si(OC_2H_5)_4$,
$(C_6H_5)Si(OCH_3)_3$,
$Si(OCH_3)_2Cl_2$,
$(C_6H_5)_2Si(OCH_3)_2$,
$(C_6H_5((CH_3)Si(OCH_3)_2$,
$(C_6H_5)Si)OC_2H_5)_3$,
$(C_6H_5)_2Si(OC_2H_5)_2$,
$NC(CH_2)_2Si(OC_2H_5)_3$,
$(C_6H_5)(CH_3)Si(OC_2H_5)_2$,
$(n\text{—}C_3H_7)Si(OC_2H_5)_3$,
$(CH_3)Si(OC_3H_7)_3$,
$(C_6H_5)(CH_2)Si(OC_2H_5)_3$,
$(C_6H_5)(CH_3)_2CSi(OCH_3)_3$,
$(C_6H_5((CH_3)_2CSi(CH_3)(OCH_3)_2$,
$(CH_3)_3CSi(CH_3)_2OSi(OCH_3)_2C(CH_3)_3$,
$(C_6H_5)Si(OCH_3)_2OSi(OCH_3)_2(C_6H_5)$,

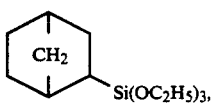

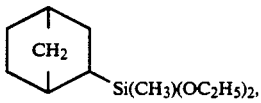

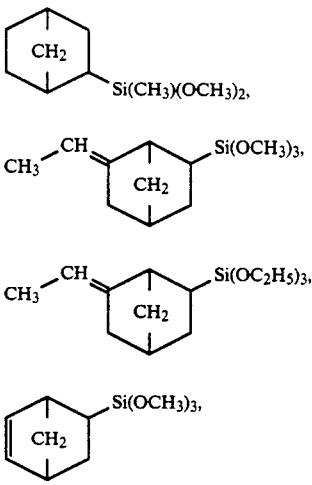

$(CH_3)_3CSi(CH_3)(OCH_3)_2$,
$(CH_3)_3CSi(HC(CH_3)_2)(OCH_3)_2$,
$(CH_3)_3CSi(CH_3)(OC_2H_5)_2$,
$(C_2H_5)_3CSi(CH_3)(OCH_3)_2$,
$(CH_3)(C_2H_5)CHSi(CH_3)(OCH_3)_2$,
$(CH_3)_2CH)_2Si(OCH_3)_2$,
$((CH_3)_2CHCH_2)_2Si(OCH_3)_2$,
$(C_2H_5(CH_3)_2CSi(CH_3)(OCH_3)_2$,
$(C_2H_5)(CH_3)_2CSi(CH_3)(OC_2H_5)_2$,
$(CH_3)_3CSi(OCH_3)_3$,
$(CH_3)_3CSi(OC_2H_5)_3$,
$(C_2H_5)_3CSi(OC_2H_5)_3$,
$(CH_3)(C_2H_5)CHSi(OCH_3)_3$,
$(C_2H_5)(CH_3)_2CSi(OCH_3)_3$,
$(C_2H_5)(CH_3)_2CSi(OC_2H_5)_3$,
$(C_2H_5)_3CSi(OC_2H_5)_3$,
$(CH_3)(C_2H_5)CHSi(OCH_3)_3$,
$((CH_3)_3C)_2Si(OCH_3)_2$.

Sub-component (III)

Sub-component (iii) is a vinylsilane compound.

More specifically, the compound is such that at least one of the hydrogen atoms in monosilane $SiH_4$ has been replaced by a vinyl group, $CH_2\text{=}CH\text{—}$, and all or some of the remaining hydrogen atoms has been replaced by another group such as a halogen, preferably a chlorine atom; an alkyl, preferably one having 1 to 12 carbon atoms; an alkoxy, preferably 1 to 12 carbon atoms; an aryl, preferably phenyl; and the like.

Examples of the silicon compound include:
$CH_2\text{=}CH\text{—}SiH_3$,
$CH_2\text{=}CH\text{—}SiH_2(CH_3)$,
$CH_2\text{=}CH\text{—}SiH(CH_3)_2$,
$CH_2\text{=}CH\text{—}Si(CH_3)_3$,
$CH_2\text{=}CH\text{—}SiCl_3$,
$CH_2\text{=}CH\text{—}SiCl_2(CH_3)$,
$CH_2\text{=}CH\text{—}SiCl(CH_3)H$,
$CH_2\text{=}CH\text{—}SiCl(C_2H_5)_2$,
$CH_2\text{=}CH\text{—}Si(C_2H_5)_3$,
$CH_2\text{=}CH\text{—}Si(CH_3)(C_2H_5)_2$,
$CH_2\text{=}CH\text{—}Si(C_6H_5)(CH_3)_2$,
$CH_2\text{=}CH\text{—}Si(CH_3)_2(C_6H_4.CH_3)$,
$CH_2\text{=}CH\text{—}Si(OCH_3)_3$,
$CH_2\text{=}CH\text{—}Si(OC_2H_5)_3$,
$CH_2\text{=}CH\text{—}Si(C_2H_5)(OCH_3)_2$,
$CH_2\text{=}CH\text{—}Si(OC_2H_5)_2H$,

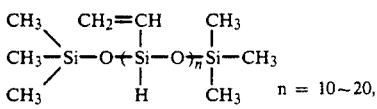

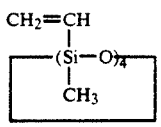

(CH$_2$=CH)(CH$_3$)$_2$—Si—O—Si(CH$_3$)$_2$(CH=CH$_2$), (CH$_2$=CH)$_2$SiCl$_2$, and (CH$_2$=CH)$_2$Si(CH$_3$)$_2$ Vinylsilanes free of an oxygen atom are preferable, and vinylalkylsilanes are more preferable.

Sub-component (iv)

Sub-component (iv) for preparing a solid catalyst component in accordance with the present invention is an organometal compound of a metal of the Group I to III of the Periodic Table.

Examples of the metals include lithium, magnesium, aluminum and zinc, but aluminum is representable.

The compounds are organometal compounds and thus have at least one organic radical-metal bonding. The organic radical may typically ba a hydrocarbyl group of 1 to 10 carbon atoms, preferably 1 to 6 carbon atoms.

The remaining valence of the metal in question other than those satisfied by an organic radical, if any, can be satisfied by a hydrogen atom, a halogen atom, hydrocarbyloxy group of 1 to 10, preferably 1 to 6, carbon atoms, or the metal itself with an oxygen bridge such as

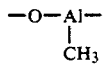

when the compounds are methylalminoxanes.

Specific examples of such organometal compounds may include (a) organolithium compounds, e.g. methyllithium, n-butyllithium, sec.-butyllithium, tert.-butyllithium and the like; (b) organomagnesium compounds, e.g. diethylmagnesium, ethylbutylmagnesium, dibutylmagnesium, dihexylmagnesium, hexylethylmagnesium, ethylmagnesium chloride ethylmagnesium bromide, butylmagnesium chloride, tert.-butylmagnesium bromide, and the like; (c) organozinc compounds, e.g. diethylzinc, dimethylzinc, dibutylzinc, and the like; (d) organoaluminum compounds, such as trialkylaluminum, e.g. trimethylaluminum, triethylaluminum, triisotutylaluminum, tri-n-hexylaluminum; alkylaluminum halides, e.g. dimethylaluminum chloride, diethylaluminum chloride, diisobutylaluminum chloride, diphenylaluminum chloride; ethylaluminum sesquichloride, ethylaluminum dichloride; alkylaluminum hydrides, e.g. diethylaluminum hydride; alkylaluminum alkoxides, e.g. diethylaluminum ethoxide; alkylalumoxanes e.g. methylaluminoxane, and the like. Among these, organoaluminum compounds are preferable. Further examples of organoaluminum compounds may be found in the examples of organoaluminum compounds as the Component (B) which will be given hereinbelow.

Preparation of the Component (A)

The contacting conditions can be as desired, so long as the advantages inherent in the present invention can be attained, but generally the following conditions are preferred. The contact temperature may be about −50° to 200° C., preferably 0° to 100° C., more preferably 10° to 35° C. As the contacting method, there may be employed the mechanical method wherein a rotating ball mill, a vibrating ball mill, a jet mill, a medium stirring pulverizer or the like is used and the method in which contact is effected with stirring under the presence of an inert diluent. As the inert diluent to be used, aliphatic or aromatic hydrocarbons and halohydrocarbons, polysiloxane, etc. may be exemplified.

The contacting order and the contacting time of the Sub-components (i) to (iv) in preparing the component (A) of the present invention may be any desired one, so long as the advantages inherent in the present invention are attained.

Specific orders of such contact may include those as shown below, where the symbol "+" indicates a contact between the components flanking the symbol, and a washing or rinsing processing can be interposed between the contacts.

(a) {Sub-component (i)+Sub-component (ii)}+Sub-component (iii)+Sub-component (iv);
  {Sub-component (i)+Sub-component (II)+Sub-component (iii)}+Sub-component (iv);
(c) {Sub-component (i)+Sub-component (iii)}+Sub-component (ii)+Sub-component (iv);
(d) {Sub-component (i)+Sub-component (iv)}+Sub-component (ii)+Sub-component (iii);
(e) {{Sub-component (iii)+Sub-component (iv)}+Sub-component (i)}+Sub-component (ii);
(f) Sub-component (i)+Sub-component (ii)+Sub-component (iii)+Sub-component (iv).

The quantitative ratio of the Sub-components (i) to (iv) can be any desired one, so long as the advantages inherent in the present invention can be attained, but generally preferred to be within the following ranges.

The quantitative ratio of the Sub-component (i) to (ii) may be within the range of 0.01 to 1000, preferably 0.1 to 100, in terms of the atomic ratio (silicon/titanium) of the silicon of the Sub-component (ii) to the titanium component constituting the Sub-component (i).

The Sub-component (iii) is used in an amount within the range of 0.001 to 1000, preferably 0.01 to 300, more preferably 0.1 to 50, in terms of the atomic ratio (silicon/titanium) of the metals {(Sub-component (iii)/(Sub-component (i)}.

The Sub-component (iv) is used in an amount within the range of 0.01 to 1000, preferably 0.1 to 100, in terms of the metal in the organometal compound to the titanium atom {Sub-component (iv)/Sub-component (i)}.

Modification of the Component (A) can be applied provided that the advantages inherent in the present invention may not be impaired.

One of the modification comprises use of another component other than Sub-components (i) to (iv) during the process for preparing Component (A), such as methylhydrogenpolysiloxane, ethyl borate, aluminum triisopropoxide, aluminum trichloride, silicon tetrachloride, a tetra-valent titanium compound of a formula: Ti(OR)$_{4-n}$X$_n$ where R is a hydrocarbyl group preferably of 1 to 6 carbon atoms, X is a halogen atom, and n is $0 \leq n \leq 4$, a tri-valent titanium compound, wolfram hexachloride, molybderum pentachloride and the like.

The Component (A) can be used as such as a solid catalyst component, but can be used after it has undergone the treatment with an ethylenically unsaturated monomer is what is called preliminary polymerization wherein it is contacted, optionally in the presence of an organoaluminum compound, with an α-olefin to produce on the solid catalyst component a small amount of a polymer of the α-olefin.

Reaction conditions of the preliminary polymerization, when such is practiced, are any suitable one, and are preferably as follows.

The polymerization temperature is 0° to 80° C., preferably 10° to 60° C. The amount of the α-olefins is 0.01 to 100 times, preferably 0.1 to 10 times, the weight of the Component (A) before the treatment. Hydrogen gas can be used at the preliminary polymerization.

The organoaluminum compounds, when such is used, are those conventionally used in Ziegler catalysts, and include, for example:

$Al(C_2H_5)_3$,
$Al(iC_4H_9)_3$,
$Al(C_5H_{11})_3$,
$Al(n-C_6H_{13})_3$,
$Al(C_8H_{17})_3$,
$Al(C_{10}H_{21})_3$,
$Al(C_2H_5)_2Cl$,
$Al(iC_4H_9)_2Cl$,
$Al(C_2H_5)_2H$,
$Al(iC_4H_9)_2H$,
$Al(C_2H_5)_2(OC_2H_5)$,
methylaluminoxane, and
isobutylaluminoxane.

Preferable are $Al(C_2H_5)_3$ and $Al(iC_4H_9)_3$.

Combinations of a trialkylaluminum with an alkylaluminum halide, of a trialkylaluminum with an alkylaluminum halide and an alkylaluminum ethoxide are also effective, and include, for example:

$Al(C_2H_5)_3 + Al(C_2H_5)_2Cl$,
$Al(iC_4H_9)_3 + Al(iC_4H_9)Cl$,
$Al(C_2H_5)_3 + Al(C_2H_5)_{1.5}Cl_{1.5}$, and
$Al(C_2H_5)_3 + Al(C_2H_5)_2Cl + Al(C_2H_5)_2(OC_2H_5)$ The quantity of an organoaluminum compound in the preliminary polymerization ma) be such that the molar ratio of Al/Ti in the Component (A) is 1 to 20, preferably 2 to 10. The preliminary polymerization can be practiced also in the presence of an electron donor such as an alcohol, an ester or a ketone which are described hereinbefore.

The α-olefins for the treatment or preliminary polymerization include, for example, ethylene, propylene, 1-butene, 2-butene, isobutylene 1-pentene, 2-pentene, 2-methyl-1-butene, 3-methyl-1-butene, 1-hexene, 2-hexene, 3-hexene, 2-methyl-1-pentene, 3-methyl-1-pentene, 4-methyl-1-pentene, 2-methyl-2-pentene, 3-methyl-2-pentene, 4-methyl-2-pentene, 2-ethyl-1-butene, 2,3-dimethyl-1-butene, 3,3-dimethyl-1-butene, 2,3-dimethyl-2-butene, 1-heptene, 1-octene, 2-octene, 3-octene, 4-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, styrene, α-methylstyrene, divinylbenzene, 1,3-butadiene, isoprene, 1,4-hexadiene, 1,5-hexadiene, 1,3-pentadiene, 1,4-pentadiene, 2,3-pentadiene, 2,6-octadiene, cis 2, trans 4-hexadiene, trans 2, trans 4-hexadiene, 1,2-heptadiene, 1,4-heptadiene, 1,5-heptadiene, 1,6-heptadiene, 2,4-heptadiene, dicyclopentadiene, 1,3-cyclohexadiene, 1,4-cyclohexadiene, cyclopentadiene, 1,3-cycloheptadiene, 4-methyl-1,4-hexadiene, 5-methyl-1,4-hexadiene, 1,9-decadiene, 1,13-tetradecadiene.

Component (B)

The component (B) is an organoaluminum compound. Specific examples may include those represented by $R^8{}_{3-n}AlX_n$ or $R^9{}_{3-m}Al(OR^{10})_m$ wherein $R^8$ and $R^9$ are each hydrocarbyl groups having about 1 to 20 carbon atoms or hydrogen atom, $R^{10}$, which may be the same as or different from $R^9$, is a hydrocarbyl group of about 1 to 20 carbon atoms, X is a halogen atom, n and m are respectively numbers of $0 \leq n \leq 3$, $0 \leq m \leq 3$.

Specific examples include (a) trialkylaluminums such as trimethylaluminum, triethylaluminum, triisobutylaluminum, trihexylauminum, trioctylaluminum, tridecylaluminum, and the like; (b) alkylaluminum halides such as diethylaluminum monochloride, diisobutylaluminum monochloride, ethylaluminum sesquichloride, ethylaluminum dichloride, and the like; (c) dialkylaluminum hydrides such as diethylaluminum hydride, diisobutylaluminum hydride and the like; (d) aluminum alkoxides such as diethylaluminum ethoxide, diethylaluminum phenoxide, (e) alumoxanes such as methylalumoxane, ethylalumoxane, isobutylalumoxane, e.g. hexaisobutylalumoxane, methylisobutylalumoxane, and the like.

The organoaluminum compounds of (a) to (c) can be used in combination with alkylaluminum alkoxides, such as, for example, alkylaluminum alkoxides represented by the formula: $R^{11}{}_{3-a}Al(OR^{12})_a$ wherein $1 \leq a \leq 3$, $R^{11}$ and $R^{12}$, which may be either the same or different, are each hydrocarbyl groups having about 1 to 20 carbon atoms. For example, there may be included combinations of triethylaluminum with diethylaluminum ethoxide; of diethylaluminum monochloride with diethylaluminum ethoxide; of ethylaluminum dichloride with ethylaluminum diethoxide; and of triethylaluminum, diethylaluminum ethoxide and diethylaluminum chloride.

More preferable organoaluminum compounds are trialkylaluminums, alkylaluminum hydrides, alumoxanes and mixtures of at least two of these.

In addition to the above-shown examples of the alumoxanes, other preferred examples of aluminoxanes include:

(i) cyclic aluminoxanes of a formula $$\left[ \begin{array}{c} R^4 \\ | \\ \text{Al}-\text{O} \end{array} \right]_m$$

where $R^4$ is a hydrocarbyl group of 1 to 8 carbon atoms, preferably 1 to 4 carbon atoms, and m is a number of 2 to 100, preferably 4 to 40, and (ii) linear aluminoxanes of a formula $$R^5 + Al-O \overline{)_n} Al - R^7 R^8$$
$$\quad\ \ |$$
$$\quad R^6$$

where $R^5$, $R^6$, $R^7$ and $R^8$ are each a hydrocarbyl group of 1 to 8 carbon atoms, preferably 1 to 4 carbon atoms, and n is a number of 2 to 100, preferably 4 to 40.

These aluminoxanes are prepared by any suitable methods including, for example:

(a) a method wherein a trialkylaluminum is reacted with free water in a suitable organic solvent such as, e.g. toluene, benzene and ether;

(b) a method wherein a trialkylaluminum is reacted with water of crystallization of a hydrated salt such as, e.g. copper sulfate hydrate and aluminum sulfate; and (c) a method wherein a trialkylaluminum is reacted with water adsorbed in silica gel or the like.

The products of these methods may be mixtures of the cyclic and the linear aluminoxanes, and no necessity is usually found for separating the cyclic structure from the linear structure for use in the present process.

The amount of the component (B) used may be 0.01 to 1000, preferably 0.1 to 100, in terms of weight ratio of Component (B)/Component (A).

Component (C) (optional)

The catalyst in accordance with the present invention comprises Component (A) and Component (B), and can contain another component which is compatible with the present invention as described hereinabove.

Examples of Component (C) may include electron donor compounds such as ethers, esters, amines, and inorganic alkoxy compounds.

Examples of such compounds may include:

(a) ethers, such as diphenyldimethoxymethane, and encapritol, 2,5-dimethylhexahydrofuran;

(b) esters, such as aromatic carboxylates, e.g. ethyl benzoate, ethyl p-toluate, and methyl p-toluate;

(c) amines, such as hindered amines, e.g. 2,2,6,6-tetramethylpyperidine, 2,6-dimethylpyperidine, di-tert.-butylamine, and diisobutylmethylamine;

(e) inorganic alkoxy compounds, such as borates, e.g. triethyl borate, and trimethyl borate; alkoxysilanes, e.g. ethyl silicate, phenyltriethoxysilane, phenyltrimethoxysilane, diphenyldimethoxysilane, diisobutyldimethoxysilane, di-tert.-butyldimethoxysilane, tert.-butylmethyldimethoxysilane, cyclohexylmethyldimethoxysilane, phenylisopropyldimethoxysilane, norbornylmethyldimethoxysilane, diphenylmethylmonomethoxysilane, and diphenylisopropylmonoethoxysilane; and others, e.g. triethyl phosphite, triphenyldiethoxyphosphorus, tris(diphenylmethoxyaluminum, and bis(diphenylmethoxy)aluminumethyl.

Component (C), an optional component, may be used in any suitable and desired way so that, for example, aromatic carboxylic acid esters, hindered amines or alkoxysilanes are used for improving the stereospecificity of the polymers to be produced, and inorganic alkoxides such as borates are used for improving the flowability at molding of the polymer to be produced.

The amount of the component (C) used may be within the range of 0.01 to 300, preferably 0.1 to 100, in terms of molar ratio relative to the Sub-component (i) in the Component (A).

Makinq up of a catalyst

The catalysts in accordance with the present invention may be made up by contacting Components (A) and (B) or (A), (B) and an optional component each other at once, or step-wisely or portion-wisely, within or outside a polymerization vessel in the absence or presence of an α-olefin to be polymerized.

The Components (A) and (B) can be introduced to the place where they are contacted in any suitable way, but it may be preferred to bring it into contact each other in a dispersion in an aliphatic hydrocarbon such as hexane or heptane before or after they are introduced into a polymerization vessel. Component (A) can also be introduced into a polymerization vessel as a solid and separately from Component (B). cl [II] Polymerization of olefins Not only are the catalysts of the present invention applicable to ordinary slurry polymerization but they may also be used for liquid-phase, solventless polymerization wherein substantially no solvent is used, solution polymerization and vapor-phase polymerization, in a continuous or a batch-wise fashion. The catalysts in accordance with the present invention can be used not only in continuous polymerization and batchwise polymerization but also in the polymerization wherein a preliminary polymerization is conducted in which a small amount of an α-olefin is polymerized by the catalyst. In the case of slurry polymerization, aliphatic or aromatic hydrocarbons such as hexane, heptane, pentane, cyclohexane, benzene, toluene and kerosene are used alone or in combination as the polymerization solvent. The polymerization may be practiced at any suitable temperature such as from room temperature to ca. 200° C., preferably 50° to 150° C. and under any suitable pressure, preferably under a pressure of atmospheric to 1000 kg/cm², preferably atmospheric to 150 kg/cm², and hydrogen can be used additionally as the molecular-weight regulator. When the polymerization is conducted by means of slurry polymerization, the quantity of Component (A) used may preferably be 0.0001 to 0.1 g (A)/liter of solvent.

The olefins to be polymerized with the catalyst systems of the present invention are represented by the general formula:

$$R-CH=CH_2$$

wherein R is a hydrogen atom or a hydrocarbyl residue which has 1 to 10 carbon atoms and can contain a branched group.

Specific examples of such olefins may include ethylene, propylene, butene-1, pentene-1, hexene-1, 3-methylbutene-1 and 1,4-methylpentene. Preference is given to ethylene and propylene, propylene being more preferable. In polymerization of ethylene, ethylene can be copolymerized with the aforesaid olefin in an amount of up to 50 weight %, preferably up to 20 weight %, based on the ethylene. In polymerization of propylene, propylene can be copolymerized with the aforesaid olefin, preferably ethylene, in an amount of up to 30% by weight of the propylene.

8 EXPERIMENTAL EXAMPLES]

EXAMPLE -1

[Preparation of Component (A))

Into a flask purged with nitrogen was introduced 200 ml of dehydrated and deoxygenated n-heptane, and subsequently 0.1 mol of MgCl₂ and 0.2 mol of Ti-(O—nC₄H₉)₄ and the reaction was carried out at 95° C. for 2 hours. After completion of the reaction, the temperature was lowered to 40° C., followed by addition of 12 ml of methylhydrogenpolysiloxane (of 20 centistokes) and the reaction was carried out for 3 hours. The solid product formed was washed with n-heptane.

Subsequently into a flask purged with nitrogen was introduced 50 ml of n-heptane purified similarly as described above, and the solid product synthesized above was introduced in an amount of 0.03 mol as calculated on Mg atom. Then, a mixture of 25 ml of n-heptane with 0.05 mol of SiCl₄ was introduced into the flask at 30° C. over 30 minutes, and the reaction was carried out at 70° C. for hours. After completion of the reaction, the product was washed with n-heptane. Then, 0.003 mole of phthaloyl chloride in 25 ml of n-heptane was introduced into the flask at 90° C. for 30 minutes and the reaction was conducted at 95° C. for 1 hour. The product was then washed with n-heptane. 6 ml of $SiCl_4$ and 80 ml of n-heptane were then introduced and reacted at 90° C. for 3 hours, after which the product was washed with n-heptane. The solid product produced was found to contain 1.55% of titanium, which was used as Sub-component (i) for preparing Component (A).

Into a flask purged with nitrogen was introduced 80 ml of amply purified n-heptane, and then 4 g of the solid product obtained above, Sub-component (i), was introduced. Next, 2.7 mmol cf $(CH_3)_3CSi(CH_3)(OCH_3)_2$ as the silicon compound of the Sub-component (ii) and 2.7 mmol of vinyltrimethylsilane as Sub-component (iii) were introduced and were contacted at 30° C. for 1 hour. The product was cooled to 15° C., and 15 mmol of triethylaluminum of the Sub-component (iv) diluted with n-heptane was introduced dropwise at 15° C. over 30 minutes and reacted at 30° C. for 2 hours. After completion of the reaction, the product was amply washed with n-heptane to provide 3.9 g of Component (A), which was found to contain 1.35% by weight of titanium.

[Polymerization of propylene]

Into a polymerization vessel with a stirring and a temperature control means of 1.5 liter capacity were introduced 500 ml of amply dehydrated and deoxygenated n-paraffin, 125 mg of triethylaluminum of Component (B) and 15 mg of the above synthesized Component (A). Polymerization of propylene was conducted, upon introduction of 60 ml of hydrogen, at a temperature of 75° C. and under a pressure of 5 $Kg/cm^2G$ for 2 hours, after which the polymer slurry obtained was subjected to filtration to separate the polymer and the polymer obtained was dried.

A polymer in a yield of 221.5 g was obtained. Further crop of a polymer in an amount of 0.44 g was obtained from the filtrate. The polymer yield per catalyst was thus 14,800 g polymer/solid catalyst, and the catalyst activity per the titanium atom was $129 \times 10^4$ g polymer/g titanium.

The polymer had an MFR of 1.92 g/10 min., and the bulk density of 0.421 g/ml.

Analysis by means of density-gradient tube on a sheet of the polymer prepared by press-forming showed that the polymer density was 0.9070 g/ml.

EXAMPLE -2

[Preparation of Component (A)]

Into a flask purged with nitrogen was introduced 200 ml of dehydrated and deoxygenated n-heptane, and subsequently 0.1 mol of $MgCl_2$ and 0.2 mol of $Ti-(O-nC_4H_9)_4$ and the reaction was carried a: 95° C. for 2 hours. After completion of the reaction, the temperature was lowered to 40° C., followed by addition of 12 ml of methylhydrogenpolysiloxane (of 20 centistokes) and the reaction was carried out for 3 hours. The solid product formed was washed with n-heptane.

Subsequently into a flask purged with nitrogen was introduced 50 ml of n-heptane purified similarly as described above, and the solid product synthesized above was introduced in an amount of 0.03 mol as calculated on Mg atom. Then, a mixture of 25 ml of n-heptane with 0.05 mol of $SiCl_4$ was introduced into the flask at 30° C. over 30 minutes, and the reaction was carried out at 70° C. for 3 hours. After completion of the reaction, the product was washed with n-heptane.

Then, 0.003 mole of phthaloyl chloride in 25 ml of n-heptane was introduced into the flask at 90° C. for 30 minutes and the reaction was conducted at 95° C. for 1 hour. The product was then washed with n-heptane. 0.5 g of $WCl_6$ and 80 ml of n-heptane were then introduced and reacted at 90° C. for 3 hours, after which the product was washed with n-heptane. The solid product produced, Sub-component (i), was found to contain 0.68% by weight of titanium and 2.7% by weight of wolfram.

Into a flask purged with nitrogen was introduced 80 ml of amply purified n-heptane and then were introduced 4 g of the solid component obtained above, Sub-component (i), 2.7 mmol of $(CH_3)_3CSi(CH_3)(OCH_3)_2$ as the silicon compound of Sub-component ii), and 2.7 mmol of vinyltrimethylsilane as Sub-component (iii) and contacted at 30° C. for 1 hour. The product was then cooled to 15° C. and 15 mmol of triethylalumirum of Sub-component (iv) diluted in n-heptane was introduced dropwise at 15° C. over 30 minutes, and reacted at 30° C. for 2 hours. After completion of the contact, the product was amply washed with n-heptane until no t-butylmethyldimethoxysilane nor vinyltrimethoxysilane was detected to provide 4.1 g of Component (A), which was found to contain 0.65% of Ti, 2.7% of Al, 2.5% of W and 6.8% of t-butylmethyldimethoxysilane, % being by weight. Vinyltrimethylsilane and its polymer were not contained in the polymer.

[Polymerization of propylene]

Polymerization was conducted under the same conditions as shown in Example 1.

The results obtained are set forth in Table-1.

COMPARATIVE EXAMPLE-1

[Preparation of Component (A)]

Component (A) was prepared under the conditions as set forth in Example -1 except for the vinyltrimethylsilane being not used. Component (A) obtained was found to contain 1.23% by weight of titanium.

[Polymerization of propylene]

Polymerization was conducted under the conditions as set forth in Example-1.

The results obtained are set forth in Table-1.

COMPARATIVE EXAMPLES 2, 3, 4 AND 5

Procedures set forth in Example-2 were followed for preparing Component (A) and for polymerizing propylene except for either one of Sub-components (ii), (iii) and (iv) being not used. In Comparative Example-5, however, the polymerization was conducted after addition of 26.8 mg of diphenyldimethoxysilane.

The results obtained are set forth in Table-1.

TABLE 1

| Example No. | Sub-comp. (ii) | Sub-comp. (iii) | Sub-comp. (iv) | Ti content (wt %) | Catalyst Activity (gPP/gCAT) | Catalyst Activity (gPP/g Ti) | Atactic content (wt %) | MFR (g/10 min.) | Bulk density (g/cc) | Polymer density (g/cc) |
|---|---|---|---|---|---|---|---|---|---|---|
| Example 1 | (a) | (b) | TEA | 1.35 | 14800 | $110 \times 10^4$ | 0.20 | 1.92 | 0.421 | 0.9070 |

TABLE 1-continued

| Example No. | Sub-comp. (ii) | Sub-comp. (iii) | Sub-comp. (iv) | Ti content (wt %) | Catalyst Activity (gPP/gCAT) | (gPP/g Ti) | Atactic content (wt %) | MFR (g/10 min.) | Bulk density (g/cc) | Polymer density (g/cc) |
| --- | --- | --- | --- | --- | --- | --- | --- | --- | --- | --- |
| Comp. Ex. 1 | (a) | — | TEA | 1.29 | 10500 | $81 \times 10^4$ | 0.40 | 1.23 | 0.423 | 0.9066 |
| Example 2 | (a) | (b) | TEA | 0.65 | 17900 | $275 \times 10^4$ | 0.17 | 0.89 | 0.453 | 0.9072 |
| Comp. Ex. 2 | (a) | — | TEA | 0.63 | 10300 | $163 \times 10^4$ | 0.33 | 1.56 | 0.431 | 0.9069 |
| Comp. Ex. 3 | (a) | (b) | — | 0.69 | 7100 | $103 \times 10^4$ | 2.15 | 2.78 | 0.420 | 0.9045 |
| Comp. Ex. 4 | — | (b) | TEA | 0.58 | 8900 | $153 \times 10^4$ | 3.88 | 3.50 | 0.411 | 0.9005 |
| Comp. Ex. 5 | — | (b) | TEA | 0.58 | 9500 | $164 \times 10^4$ | 0.65 | 2.10 | 0.425 | 0.9060 |

Note:
(a): Tert.-butylmethyldimethoxysilane
(b): Vinyltrimethylsilane
TEA: Triethylaluminum

EXAMPLE -3

[Preparation of Component (A)]

Sub-component (i) was prepared under the conditions as set forth in Example-2 except for the use, in place of 0.003 mole of phthalic chloride, of 0.004 mole of cellosolve acetate followed by introduction of 0.7 g of WCl$_6$ and reaction at 70° C. for 4 hours. Sub-component (i) thus prepared was found to contain 0.77% of titanium and 3.5% of wolfram, the % being by weight.

Component (A) was prepared under the conditions as set forth in Example-2 except for the use of Sub-component (i) in an amount of 4 g. 4.2 g of Component (A) was obtained, which was found to contain 0.71% by weight of titanium.

[Polymerization of Propylene]

Polymerization was conducted under the conditions as set forth in Example-1.

The results obtained are set forth in Table-2.

COMPARATIVE EXAMPLE-6

Procedures set forth in Example-3 were followed except for the vinyltrimethylsilane of Sub-component (iii) not being used.

The results obtained are set forth in Table-2.

EXAMPLE -4

[Preparation of Component (A)]

In a ball mill of a capacity of 0.4 liter, the inside of which was dried and replaced with nitrogen, were filled with 40 stainless steel balls of a diameter of 12 mm and followed by 20 g of MgCl$_2$, 2.0 ml of tetrabutoxytitanium, 3.0 ml of dibutyl phthalate, and 2.0 ml of TiCl$_4$ and the ball mill was rotated for 48 hours to effect milling. The milled product was taken out in a dry box, and 6.0 g of the product was introduced into a flask, the inside being replaced by nitrogen, followed by addition of 40 ml of n-heptare and 40 ml of TiCl$_4$ for reaction at 90° C. for 4 hours. After the reaction, the product was washed with n-heptane to produce Sub-component (i), which was found to contain 2.38% by weight of Ti.

Component (A) was then prepared under the conditions as set forth in Example-1 except for the amount of Sub-component (i) which was 4 g. 4.0 g of Component (A) was obtained, which was found to contain 2.03% by weight of Ti.

[Polymerization of propylene]

Polymerization was conducted under the conditions as set forth in Example-1.

The results obtained are set forth in Table-2.

COMPARATIVE EXAMPLE-7

The procedure set forth in Example-4 were followed except for the vinyltrimethylsilane of Sub-component (iii) not being used.

The results obtained are set forth in Table-2.

EXAMPLE -5

[Preparation of Component (A)]

Into a flask purged with nitrogen was introduced 200 ml of dehydrated and deoxygenated n-heptane, and subsequently 0.1 mol of MgCl$_2$ and 0.2 mol of Ti-(O—nC$_4$H$_9$)$_4$ and the reaction was carried at 95° C. for 2 hours. After completion of the reaction, the temperature was lowered to 40° C., followed by addition of 12 ml of methylhydropolysiloxane (of 20 centistokes) and the reaction was carried out for 3 hours. The solid product formed was washed with n-heptane.

Subsequently into a flask purged with nitrogen was introduced 50 ml of n-heptane purified similarly as described above, and the solid product synthesized above was introduced in an amount of 0.03 mole as calculated on Mg atom. Then, a mixture of 25 ml of n-heptane with 12 ml of SiCl$_4$ was introduced into the flask at 20° C. over 30 minutes, and the reaction was carried out at 20° C. for 2 hours and then at 90° C. for further 2 hours. After completion of the reaction, the product was washed with n-heptane.

To the product were added 6.8 mmol of vinyltrimethylsilane, 5.56 mmol of (CH$_3$)$_3$CSi(CH$_3$)(OCH$_3$)$_2$, and 35 mmol of triethylaluminum diluted in n-heptane, of Sub-component (iv), was introduced dropwise at 15° C. over 30 minutes. The temperature was then raised to 30° C. and the contact was continued for 2 hours. The product was then washed with n-heptane into Component (A), which was found to contain 3.29% of Ti and 11.1% of tert.-butylmethyldimethoxysilane, the % being by weight.

[Polymerization of propylene]

Polymerization was conducted under the conditions as set forth in Example-1.

The results obtained are set forth in Table-2.

COMPARATIVE EXAMPLE-8

The procedures set forth in Example-5 were followed except for the vinyltrimethsilane of Sub-component (iii) being not used.

The results obtained are set forth in Table-2.

TABLE 2

| Example No. | Sub-comp. (iii) | Electron donor in Sub-comp. (i) | Ti content (wt %) | Catalyst Activity (gPP/gCAT) | Catalyst Activity (gPP/g Ti) | Atactic content (wt %) | MFR (g/10 min.) | Bulk density (g/ml) | Polymer density (g/ml) |
|---|---|---|---|---|---|---|---|---|---|
| Example 3 | (b) | (c) | 0.71 | 12800 | $180 \times 10^4$ | 0.21 | 2.20 | 0.432 | 0.9070 |
| Comp. Ex. 6 | — | (c) | 0.68 | 7100 | $104 \times 10^4$ | 0.45 | 3.05 | 0.405 | 0.9061 |
| Example 4 | (b) | (d) | 2.03 | 15800 | $78 \times 10^4$ | 0.40 | 1.70 | 0.390 | 0.9075 |
| Comp. Ex. 7 | — | (d) | 2.15 | 12100 | $56 \times 10^4$ | 0.65 | 1.91 | 0.335 | 0.9066 |
| Example 5 | (b) | — | 3.29 | 11000 | $33 \times 10^4$ | 1.10 | 2.57 | 0.450 | 0.9040 |
| Comp. Ex. 8 | — | — | 3.30 | 7500 | $23 \times 10^4$ | 1.75 | 2.65 | 0.421 | 0.9035 |

Note:
(b): Vinyltrimethylsilane
(c): Cellosolve acetate
(d): Dibutyl phthalate

EXAMPLES-6, 7 AND 8

The procedures set forth in Example-2 were followed except for the amount of the vinyltrimethylsilane which was varied as set forth in Table-3.
The results obtained are set forth in Table-3.

EXAMPLE -14

[Preparation of Component (A)]

The procedures for preparing Component (A) set forth in Example-2 except for the use of 4 g of Sub-component (i) obtained in Example-2, 5.5 mmol of diphenyl

TABLE 3

| Example No. | Sub-comp. (iii) | Component (A) Obtained (g) | Component (A) Ti content (wt %) | Catalyst Activity (gPP/gCAT) | Catalyst Activity (gPP/g Ti) | Atactic content (wt %) | MFR (g/10 min.) | Bulk density (g/ml) | Polymer density (g/ml) |
|---|---|---|---|---|---|---|---|---|---|
| Comp. Ex. 2 | — | 4.0 | 0.63 | 10300 | $163 \times 10^4$ | 0.33 | 1.56 | 0.431 | 0.9069 |
| Example 6 | (b) 0.6 mmol | 3.9 | 0.63 | 16500 | $262 \times 10^4$ | 0.16 | 1.21 | 0.441 | 0.9075 |
| Example 2 | (b) 2.7 mmol | 4.1 | 0.65 | 17900 | $275 \times 10^4$ | 0.17 | 0.89 | 0.453 | 0.9072 |
| Example 7 | (b) 6.7 mmol | 3.9 | 0.63 | 16800 | $257 \times 10^4$ | 0.16 | 1.32 | 0.461 | 0.9071 |
| Example 8 | (b) 27 mmol | 4.0 | 0.65 | 19100 | $293 \times 10^4$ | 0.22 | 0.81 | 0.458 | 0.9072 |

Note:
(b): Vinyltrimethylsilane

EXAMPLES-9 TO 13 AND COMPARATIVE EXAMPLES-9 TO 11

The procedures set forth in Example-2 were followed except for the use of vinyl compounds set forth in Table 4 in place of the vinyltrimethylsilane.
The results obtained are set forth in Table-4.

dimethoxysilane as Sub-component (ii), 6.8 mmol of vinyltrimethylsilane as Sub-component (iii), and 16.5 mmol of triisobutylaluminum. Component (A) obtained was found to contain 0.61% by weight of titanium.

[Polymerization of propylene]

Into a polymerization vessel with a stirring and a temperature control means of 1.5 liter capacity were introduced 500 ml of amply dehydrated and deoxygenated n-heptane, 125 mg of triethylaluminum of the

TABLE 4

| Example No. | Sub-comp. (iii) | Ti content (wt %) | Catalyst Activity (gPP/gCAT) | Catalyst Activity (gPP/g Ti) | Atactic content (wt %) | MFR (g/10 min.) | Bulk density (g/ml) | Polymer density (g/ml) | Remarks |
|---|---|---|---|---|---|---|---|---|---|
| Example 9 | (e) 2.7 mmol | 0.66 | 18100 | $274 \times 10^4$ | 0.25 | 0.95 | 0.463 | 0.9066 | — |
| Example 10 | (f) 2.7 mmol | 0.62 | 17500 | $282 \times 10^4$ | 0.15 | 1.11 | 0.456 | 0.9072 | — |
| Example 11 | (g) 2.7 mmol | 0.65 | 14500 | $223 \times 10^4$ | 0.26 | 2.01 | 0.445 | 0.9064 | — |
| Example 12 | (h) 2.7 mmol | 0.61 | 16300 | $267 \times 10^4$ | 0.16 | 1.31 | 0.455 | 0.9071 | — |
| Example 13 | (i) 2.7 mmol | 0.60 | 13900 | $232 \times 10^4$ | 0.19 | 2.33 | 0.449 | 0.9069 | — |
| Comp. Ex. 9 | (j) 2.7 mmol | 0.53 | 7300 | $138 \times 10^4$ | 0.21 | 1.15 | 0.450 | 0.9086 (m) | (n) |
| Comp. Ex. 10 | (k) 2.7 mmol | 0.69 | 10100 | $146 \times 10^4$ | 0.40 | 2.10 | 0.436 | 0.9065 | — |
| Comp. Ex. 11 | (l) 2.7 mmol | 0.44 | 6500 | $148 \times 10^4$ | 0.41 | 1.96 | 0.445 | 0.9083 (m) | (o) |

Note:
(e): Vinyldimethylchlorosilane
(f): Vinyldimethyltoluylsilane
(g): Divinyldichlorosilane
(h): Vinylphenylmethylsilane
(i): 1,3-Divinyl-1,1,3,3-tetramethyldisiloxane
(j): Allyltrimethylsilane
(k): Vinyloxytrimethylsilane
(l): 3-Methylbutene-1
(m): Nucleation found
(n): Amount of Component (A) was 4.6 g containing some allylsilane polymer
(o): Amount of Component (A) was 5.18 containing some 3-methylbutene-1 polymer Component (B), 17.6 mmol of tert.-butylmethyldimethoxysilane as an optical component, and 15 mg of the above synthesized Component (A). 60 ml of H₂ was kg/cm²G, where the gas phase was purged thereby to terminate polymerization (2nd step polymerization).

The results obtained are set forth in Table-5.

TABLE 5

| Example No. | Pressure* (kg/cm²G) 1st step | Pressure* (kg/cm²G) 2nd step | Polymer obtained (g) | Catalyst activity (gPP/gCAT) | Atactic content (wt %) | MFR 1st polymer/ 2nd polymer (g/10 min.) | Bulk density (g/ml) | Angle of repose (deg.) | 1st polymer density (g/ml) |
|---|---|---|---|---|---|---|---|---|---|
| Example 16 | 4.9 | 1.7 | 189.2 | 11700 | 2.38 | 21.2/9.8 | 0.468 | 29.0 | 0.9081 |
| Comp. Ex. 12 | 5.1 | 2.2 | 191.2 | 8700 | 3.79 | 23.8/11.5 | 0.459 | 31.0 | 0.9075 |

*The pressure at the end of the 1st and 2nd step polymerization.

introduced, and polymerization of propylene was conducted at a temperature of 75° C. and under a pressure of 5 Kg/cm²G for 2 hours, after which the polymer slurry obtained was subjected to filtration and the polymer obtained was dried.

A polymer in a yield of 186.0 g was obtained, and a further crop of a polymer in 0.51 g was obtained from the filtrate. The polymer had an MFR of 1.50 g/10 minutes, a bulk density of 0.451 ml, and polymer density of 0.9073 g/ml.

EXAMPLE -15

[Preparation of Component (A)]

The procedures for preparing Component (A) were followed except for the use of 4 mmol of diethylzinc in place of 15 mmol of triethylaluminum as Sub-component (iv) and methylhydrogen polysiloxane in an amount of 0.5 g. Component (A) produced was found to contain 0.52% by weight of titanium.

[Polymerization of propylene]

The procedures for polymerizing propylene set forth in Example-1 were followed.

A polymer in a yield of 175.5 g was obtained. A further crop of a polymer in an amount of 0.72 g was obtained from the filtrate.

The polymer had an MFR of 3.6 g/10 min, a bulk density of 0.458 g/ml and a polymer density of 0.9062 g/ml.

EXAMPLE -16 AND COMPARATIVE EXAMPLE-12

[Block copolymerization of propylene/ethylene]

Into a polymerization vessel with a stirring and a temperature control means of 1.5 liter capacity were introduced 500 ml of amply dehydrated and deoxygenated n-heptane, 17.9 mg of Component (A) obtained in Example-2 or 24.4 mg of Component (A obtained in Comparative Example-2, and 125 mg of triethylaluminum of the Component (B) under propylene atmosphere. 200 ml of hydrogen was introduced, then the temperature was raised to 75° C. and propylene was introduced in a constant rate of 0.917 g/min for 3 hours. Feed of propylene was then terminated and polymerization was left to continue at 75° C. When the pressure reacted 2 kg/cm²G, 1/10 of the polymer was sampled (last step polymerization).

The gas phase was purged until the pressure reached 0.2 kg/cm²G, and 0.025 mmol of methyl borate B(OCH₃)₃, was introduced as an optional component. Propylene and ethylene were then introduced at constant rates of 0.133 g/min and 2.00 g/min, respectively, at 65° C. over 1.5 hours. Polymerization was left to continue still thereafter until the pressure reached 1.0

What is claimed is:

1. A solid catalyst component for Ziegler catalysts obtained by contacting the following Sub-components (i) to (iv):
    Sub-component (i) which is a solid catalyst component for Ziegler catalysts comprising titanium, magnesium and a halogen as the essential components;
    Sub-component (ii) which is a hydrocarbyl hydrocarbyloxysilane having a plurality of bonds represented by the formula: SiOR¹, wherein R¹ indicates a hydrocarbyl group of 1 to 8 carbon atoms,
    Sub-component (iii) which is a vinylalkylsilane; and
    Sub-component (iv) which is an organometal compound of a metal of Groups I to III of the Periodic Table.

2. The solid catalyst component as claimed in claim 1 wherein the solid catalyst component of Sub-component (i) has an electron donor incorporated therein.

3. The solid catalyst component as claimed in claim 1 wherein the Sub-component (i) is a product prepared by a method selected from the group of:
    (1) a method in which a solid product obtained by contacting a magnesium halide with a titanium tetraalkoxide and a polymeric silicon compound is contacted with a titanium halide compound and/or a silicon halide compound, the polymeric silicon compound represented by the formula

wherein R is a hydrocarbyl group having about 1 to 10 carbon atoms, n is a polymerization degree such that the viscosity of the polymeric silicon compound may be 1 to 100 centistokes;
    (2) a method in which a magnesium compound is dissolved in a titanium tetraalkoxide and an electron donor, and the solid component precipitated from the solution upon addition thereto of a halogenating agent selected from the group of silicon halides, aluminum halides and halogen compounds of phosphorus or a titanium halide compound is contacted with a titanium compound; and
    (3) a method in which a magnesium dihalide and a titanium tetraalkoxide and/or a polymer thereof are contacted, and subsequently with the polymericsilicon compound.

4. The solid catalyst component as claimed in claim 1, wherein the hydrocarbyl hydrocarbyloxysilane is such that the hydrocarbyl group in the hydrocarbyl hydrocarbyloxysilane has the alpha-carbon atom which is secondary or tertiary and has 3 to 20 carbon atoms.

5. The solid catalyst component as claimed in claim 1 wherein the organometal compound of Sub-component (iv) is an organoaluminum compound selected from the group consisting of a trialkylaluminum, an alkylaluminum halide, and an alkylalumoxane.

6. The solid catalyst component as claimed in claim 1 wherein the Component (A) is contacted with an alpha-olefin in the presence or absence of an organoaluminum compound thereby to polymerize the alpha-olefin on the Component (A) in an amount of 0.01 to 100 times the weight of the Component (A) before the contact of the alpha-olefin.

7. A catalyst for polymerizing an alpha-olefin which comprise Component (A) as claimed in claim 1 and Component (B) which is an organoaluminum compound.

8. The solid catalyst component as claimed in claim 1, wherein the hydrocarbylhydrocarbyloxysilane of Sub-component (ii) is such that its hydrocarbyl group has up to 20 carbon atoms and the vinylalkylsilane of Sub-component (iii) is such that its alkyl group has 1 to 12 carbon atoms.

* * * * *